(12) United States Patent
Shepherd et al.

(10) Patent No.: US 7,068,976 B2
(45) Date of Patent: Jun. 27, 2006

(54) METHOD OF VERIFYING OPERATION OF LISTENING CONTROL CHANNEL

(75) Inventors: Johnny Shepherd, Hillsborough, NC (US); Jeff Seifert, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 485 days.

(21) Appl. No.: 10/025,415

(22) Filed: Dec. 18, 2001

(65) Prior Publication Data

US 2003/0114111 A1   Jun. 19, 2003

(51) Int. Cl.
*H04B 17/00* (2006.01)
*H04B 1/00* (2006.01)

(52) U.S. Cl. ............... 455/67.11; 455/63.1; 455/67.13; 455/67.15

(58) Field of Classification Search ............... 455/63.1, 455/67.11, 67.13, 67.15, 423, 424
See application file for complete search history.

(56) References Cited

U.S. PATENT DOCUMENTS

| 5,263,175 | A | * | 11/1993 | Dejmek ............. 455/10 |
| 5,471,146 | A | * | 11/1995 | Krayeski et al. ............. 324/637 |
| 5,603,093 | A | * | 2/1997 | Yoshimi et al. ............. 455/63.1 |
| 5,752,165 | A | * | 5/1998 | Hokkanen ............. 455/67.11 |
| 5,970,396 | A | * | 10/1999 | Takashima ............. 455/135 |
| 6,002,928 | A | * | 12/1999 | Yoon et al. ............. 455/423 |
| 6,112,082 | A | | 8/2000 | Almgren et al. |
| 6,151,482 | A | * | 11/2000 | Eriksson ............. 455/67.11 |
| 6,697,616 | B1 | * | 2/2004 | Heinz et al. ............. 455/424 |
| 2002/0028675 | A1 | * | 3/2002 | Schmutz et al. ............. 455/424 |
| 2003/0026220 | A1 | * | 2/2003 | Uhlik et al. ............. 370/328 |
| 2003/0060209 | A1 | * | 3/2003 | Bruin et al. ............. 455/452 |

* cited by examiner

*Primary Examiner*—Lester G. Kincaid
*Assistant Examiner*—Un C. Cho
(74) *Attorney, Agent, or Firm*—Coats & Bennett, P.L.L.C.

(57) ABSTRACT

A base station tunes a transceiver to listen to accesses made by mobile terminals on the base station's own control channel. Once the functionality of the transceiver is verified by correlating the known accesses to the received accesses, the base station then tunes the transceiver to control channels of nearby cells to receive accesses directed to those nearby cells. From these accesses, the MSC can determine carrier-to-interference ratios between the cells.

12 Claims, 4 Drawing Sheets

METHOD OF VERIFYING OPERATION OF LISTENING CONTROL CHANNEL

BACKGROUND OF THE INVENTION

The present invention relates to a base station equipped with an interference measuring device, and more particularly, to a method of testing the measuring device to determine if the interference measuring device is working properly.

In cellular communication systems, frequency reuse plans allow the same frequency to be used more than once within the system. Rather than use a single high power transmitter to cover a large geographic area, cellular systems employ a large number of low-power transmitters that broadcast signals in relatively small geographic areas referred to as cells. Each cell may be only a few miles across, and theoretically could be as small as a few city blocks. By reducing the coverage area of the transmitter and creating a large number of cells, it is possible to reuse the same frequency in different cells. Thus, a single frequency may be used multiple times throughout the entire cellular system to increase system capacity.

To avoid co-channel interference, cells operating on the same frequency are spatially separated so that a mobile terminal operating within a cell receives desired signals at a higher level than any potential interfering signals from co-channel cells. Cells operating at different frequencies are placed between any two co-channel cells. In general, the power of any interfering signal diminishes with increasing distance between interfering users. A carrier frequency can be reused if the interference level is reduced sufficiently by separation between the co-channel cells. The interference level is measured by the carrier power to interference power ratio, C/I.

Interference is one of the major limiting factors in the performance of a mobile communication network. Ideally, interference between cells should be minimized. However, there are presently few techniques by which interference between cells can be measured. One technique currently being used involves sending a technician to the field to make phone calls and evaluate signal quality. Another technique, proposed by the assignee of the present invention, involves the base stations listening to access requests made by mobile terminals on an access channel in neighboring cells. A base station using this method tunes one of its receivers to an access channel of a neighboring cell and performs measurements on the access requests made by mobile terminals in the neighboring cell. This functionality is sometimes referred to as a Listening Control Channel (LICC). With enough measurements from various base stations within a measurement area, a mobile switching center can estimate a carrier-to-interference ratio.

SUMMARY OF THE INVENTION

The present invention provides a method through which the functionality of a listening transceiver used to estimate the C/I ratio can be verified before performing signal strength measurements. The listening transceiver tunes to the control channel for the home base station and listens for an access request on the control channel. A control channel transceiver at the home base station also receives access requests on the control channel. If the control channel transceiver receives an access request that is not received by the listening transceiver, the base station assumes that the listening transceiver is dysfunctional and generates an alarm. If the listening transceiver receives an access request, the signal strength of the access request measured by the listening transceiver is compared to the signal strength measured by the control channel transceiver to verify that the listening transceiver is functioning properly. If the signal strength measurements are within predetermined limits, the listening transceiver is determined to be operating properly. If, however, there is a discrepancy, the base station generates an alarm and transmits the alarm to a MSC or other entity.

DETAILED DESCRIPTION OF THE INVENTION

Figure 1:
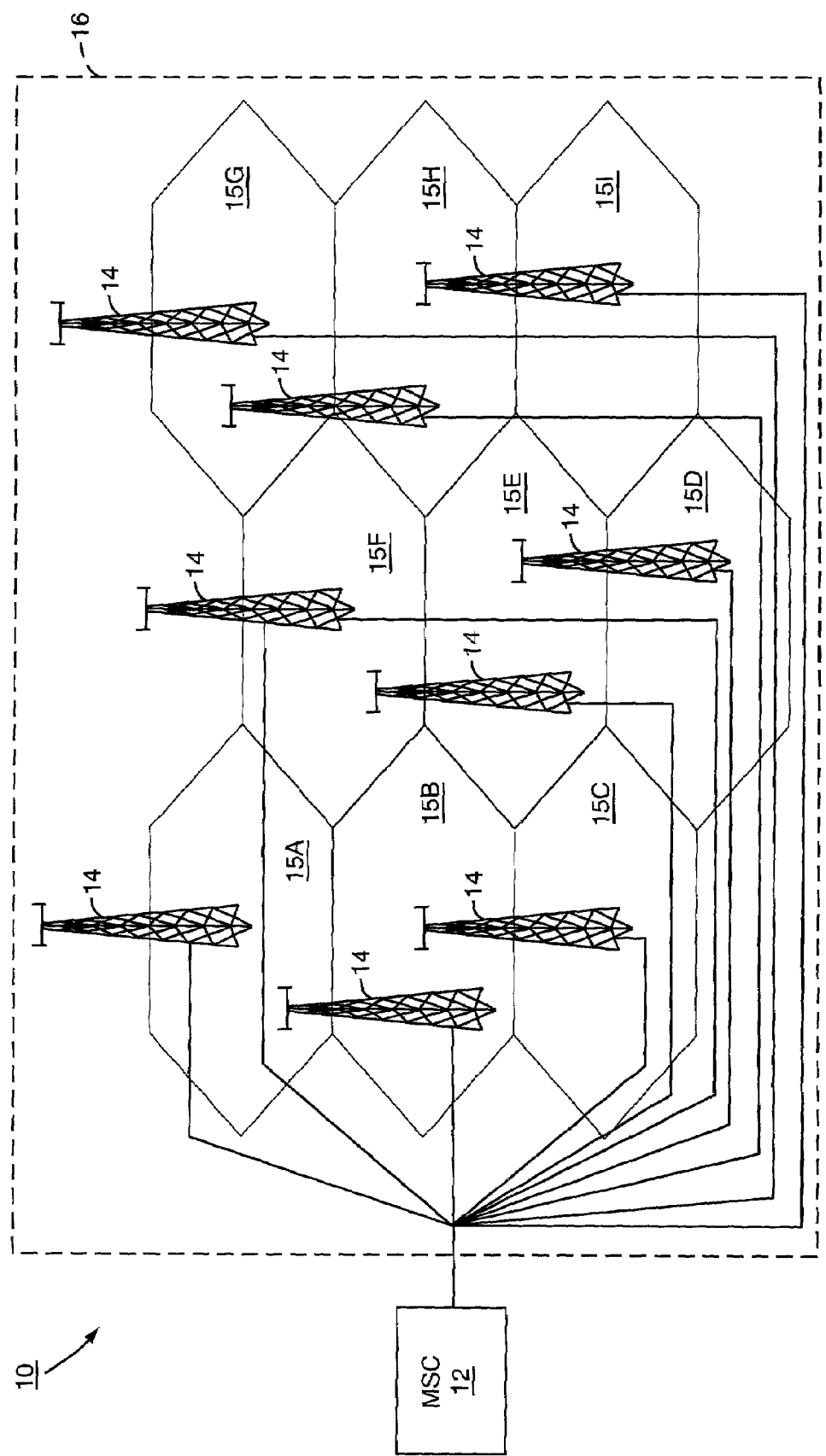
FIG. 1 is a schematic diagram illustrating an exemplary cellular network, such as may use the present invention.

The backbone of present day mobile communications is the cellular network. An exemplary cellular network 10 is illustrated in FIG. 1. The communications network 10 illustrated in FIG. 1 is based on the standards published by the Telecommunications Industry Association (TIA) and the Electronics Industry Association (EIA) known as TIA/EIA-136. FIG. 1 shows the logical architecture of a communication network and is not meant to imply any particular physical implementation. The following description is intended to describe how to implement the present invention in an exemplary mobile communication system. Those skilled in the art will recognize that the present invention can be adapted for use in mobile communication systems employing different standards, including the standards known as Global System for Mobile Communication (GSM), Digital Advance Mobile Phone Service (D-AMPS), IS-95, and IS-2000.

The cellular network shown in FIG. 1 comprises a plurality of base stations 14 which are connected by one or more mobile services switching centers (MSC) 12 to a terrestrial communications network, such as the Public Switched Telephone Network (PSTN). Each base station 14 is located in and provides service to a geographic region referred to as a cell 15. In general, there is one base station 14 for each cell 15 within a given system. Within each cell 15, there may be a plurality of mobile terminals that communicate via radio link with the base station 14. The base station 14 allows the user of the mobile terminal to communicate with other mobile terminals, or with users connected to the PSTN. The MSC 12 routes calls to and from the mobile terminals through the appropriate base station 14. Cellular network 10 may employ any of a number of well established standards such as TIA/EIA-136.

Figure 2:
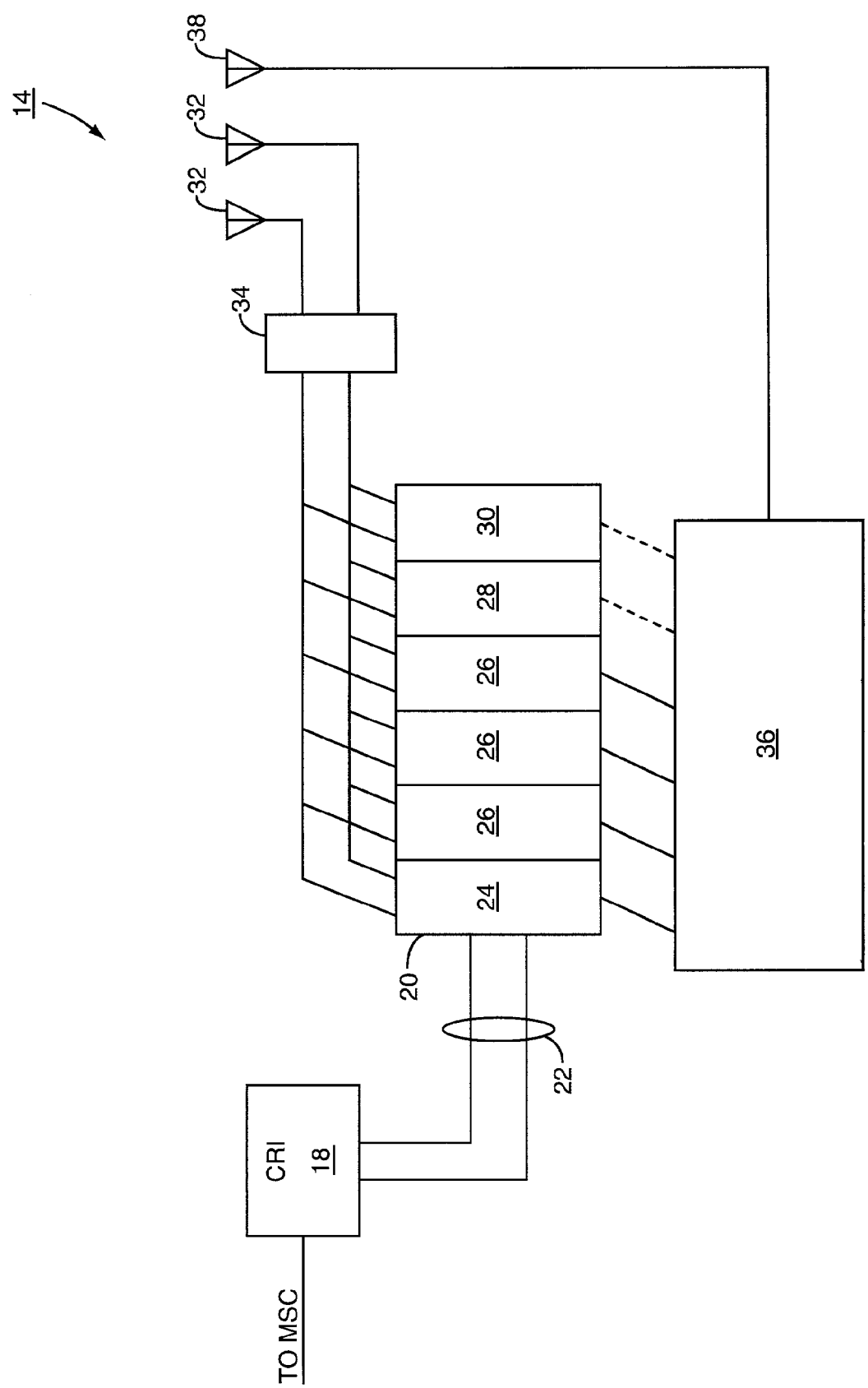
FIG. 2 is a functional block diagram illustrating an exemplary base station with a listening transceiver.

An exemplary base station 14 is illustrated in FIG. 2. The base station 14 comprises a Control and Radio Interface (CRI) 18, and a transceiver array 20. CRI 18 connects to the MSC 12 via a T1 or E1 line. Transceiver array 20 comprises a plurality of transceivers 24, 26, 28, and 30 that communicate with mobile terminals. Signals transmitted by mobile terminals are received by antennas 32, passed through a low noise amplifier (LNA) 34, and processed by the appropriate transceiver 24, 26, 28, or 30. Signals transmitted from the base station 14 are sent from the appropriate transceiver 24, 26, 28, or 30 to a transmit filter 36 and broadcast from antenna 38.

Transceiver 24 transmits and receives on the control channel frequency assigned to the base station 14 and is referred to herein as the control channel transceiver. Transceivers 26, referred to herein as traffic channel transceivers, transmit and receive on frequencies that bear user traffic. Transceiver 28 is a verification transceiver, and handles hand offs between base stations. Transceiver 28 may serve at times as a traffic channel transceiver 26. Transceiver 30, referred to herein as the listening transceiver, implements the LICC functionality described in U.S. Pat. No. 6,112,082, which is hereby incorporated by reference in its entirety. Listening transceiver 30 may also handle user traffic when it is not implementing LICC functionality.

Figure 3:
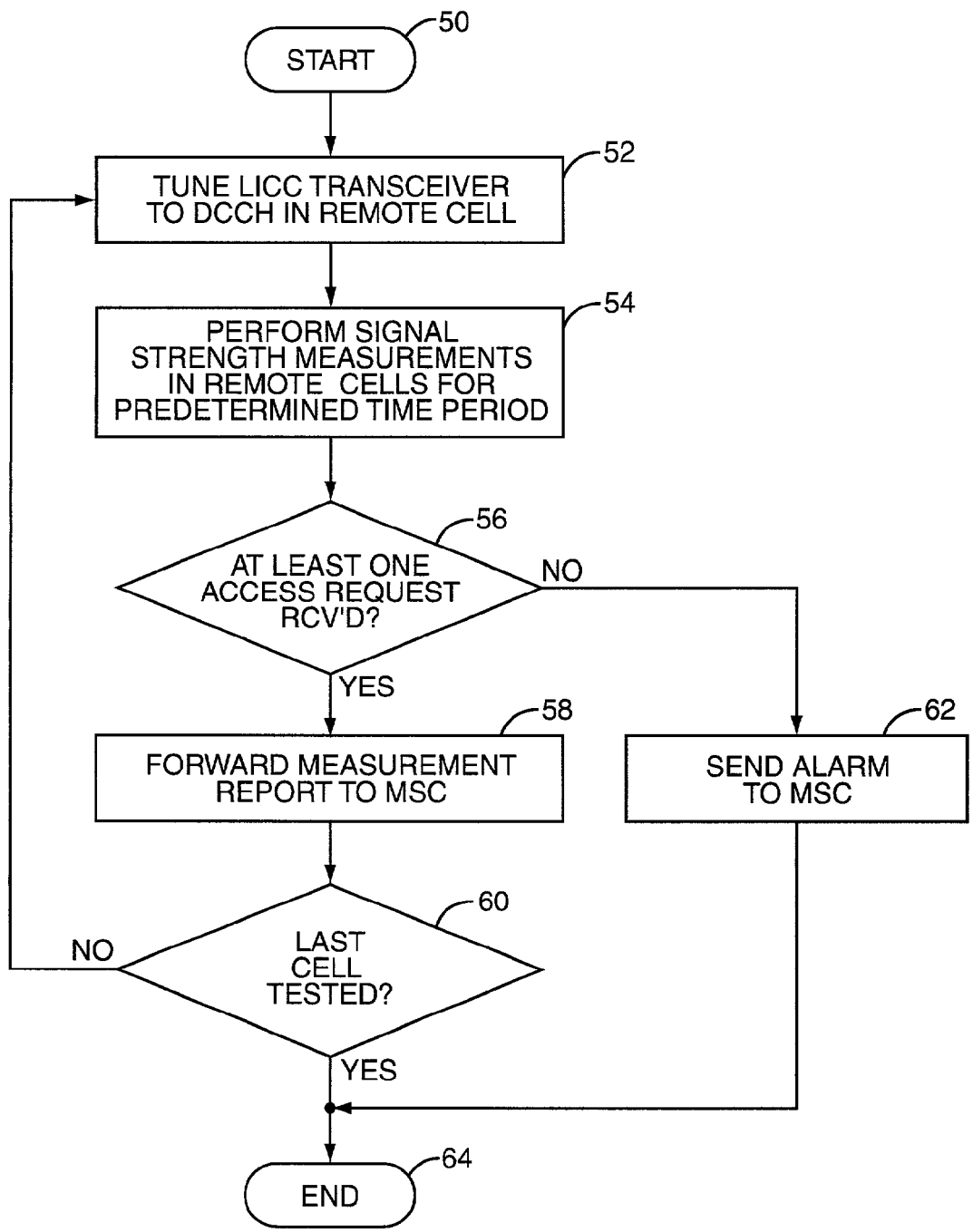
FIG. 3 is a flow diagram illustrating a procedure used by the base station for performing signal strength measurements in remote cells.

FIG. 3 is a flow diagram illustrating a signal measurement procedure used by a base station 14 to perform signal strength measurements of access requests in remote cells. The signal strength measurements may be used, for example, to compute C/I ratios as is well-known in the art. The procedure begins at block 50 when the MSC 12 instructs the base station 14 to start the LICC functionality. For the sake of clarity, an example using the cells of FIG. 1 will be used. Suppose MSC 12 wishes to determine how much cell 15H interferes with the other cells 15 within the measurement area 16. MSC 12 determines the DCCH of cell 15H. This corresponds to determining the channel number (CHNR) of the control channel (e.g., DCCH) for the cell to be measured, which in this example is cell 15H. Having determined that the DCCH of cell 15H is CHNR X, MSC 12 instructs the base stations 14 in neighboring cells to measure the signal strength of access requests made on the DCCH in cell 15H. The base stations 14 tune their respective listening transceivers 30 to CHNR X (block 52) and listen for access requests on the DCCH for a predetermined period of time. The length of the test period is not important to the present invention, but is typically in the order of ten minutes. However, the test period could be for a longer or shorter period of time. When an access request is received, the base station 14 measures the signal strength of the access request and may also determine a bit error rate (BER). The measurements may then be stored temporarily in the base station 14 or MSC 12 until the test period ends. A signal strength measurement and BER determination is made each time an access request is received until the test period expires. At the end of the test period, the base station 14 determines whether at least one access request was received (block 56). The test period may be a fixed period of time. Alternatively, the test period may terminate after the first burst that is successfully demodulated. If so, the base station 14 then forwards the signal strength measurements and BER measurements to the MSC 12 (block 58). If the base station 14 does not receive an access request in the predetermined time period, it notifies the MSC 12 that no access request was received (block 62) and the procedure ends (block 64). In the past, this procedure could result in false alarms as, e.g., cell 15B may not receive any measurements from mobile terminals in cell 15H due to path loss, terrain, or other factors. While this actually represents the fact that the C/I ratio for the cells 15B and 15H is low, a base station 14 could interpret this event as a failure of the listening transceiver 30 and generates an alarm.

The present invention avoids false alarms by performing a self-test at each base station 14 to check the functionality of the listening transceiver 30 before beginning signal strength measurements. If the listening transceiver is determined to be functional, the base station 14 using the present invention may still send a notification to the MSC 12 indicating that no access requests were received, but would not generate an alarm.

Figure 4:
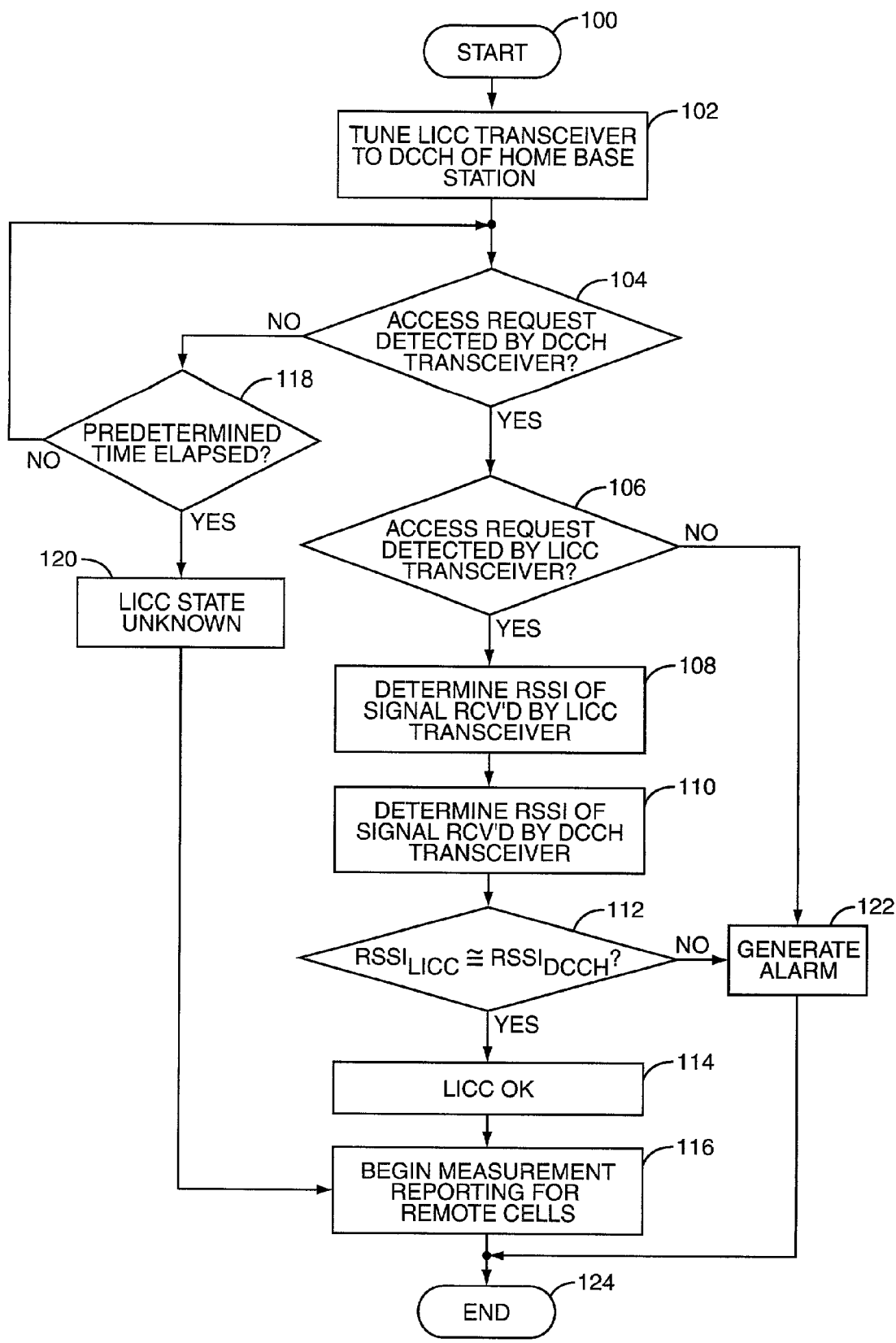
FIG. 4 is a flow diagram illustrating a testing procedure used by the base station to test the functionality of its listening transceiver.

FIG. 4 illustrates a test procedure according to the present invention to verify that the listening transceiver 30 is functional prior to beginning the signal strength measurements to determine the C/I ratio. The test procedure starts at block 100 with MSC 12 instructing the base stations 14 to perform LICC testing. The base station 14 tunes its listening receiver 30 to the control channel (e.g., DCCH) of the home base station 14 (block 102) and waits a predetermined period of time for an access request (blocks 104, 106, and 118). When an access request is received by the control channel (DCCH) transceiver 24 (block 104), the base station 14 or MSC 12 determines whether the access request was also received by the listening (LICC) transceiver 30 (block 106). If not, the base station 14 generates an alarm (block 122) to notify the MSC 12 or other appropriate entity that the listening transceiver 30 is not working properly. If the listening receiver 30 receives the access request, the base station 14 compares the signal strength of the access request measured by the listening receiver to the signal strength measured by the DCCH receiver (blocks 108, 110, 112). If the signal strength measurement is within predetermined limits, the listening receiver 30 is determined to be operating properly (block 114). The base station 14 may send a notification to the MSC 12 to notify the MSC 12 that the listening transceiver 30 is functioning. The base station 14 then begins measurement reporting for remote cells (block 116). Measurement reporting may be carried out substantially as shown in FIG. 3. Returning to block 112, if the signal strength of the access request measured by the listening transceiver 30 is not within predetermined limits of the signal strength measured by the DCCH transceiver, an alarm is generated 122 and sent to the MSC 12 or other appropriate entity.

The listening transceiver 30 remains tuned to the DCCH of the home base station until an access request is received on the DCCH, or until a predetermined test period has expired (block 118). The test period will typically be less than one minute, and may be less than 10 seconds. However, longer test periods may also be used. If an access request is not received on the DCCH within the test period, the base station 14 notifies the MSC 12 that it is not able to determine the status of the listening transceiver 30 (block 120). The base station 12 may then proceed with signal strength measurements (block 116) on channels in the remote cells, or may take other remedial actions as needed or desired, such as wait longer.

The provision of the diagnostic test allows the MSC 12 to verify that the listening transceiver 30 is functioning properly. It should be appreciated that while the present invention has described the invention as being controlled by MSC 12, other elements within the cellular network 10 may also have this control function. Likewise, this could be implemented in a pico-network or other Wireless Office solution that does not have an MSC 12 per se. Such adaptations are considered within the skill of one of ordinary skill in the art and are not detailed explicitly.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of determining interference at a first base station located in a first cell from transceivers operating in a remote cell, said method comprising:

verifying the operation of a first transceiver used to perform signal strength measurements of signals transmitted by transceivers in the remote cell, wherein said verifying comprises:

receiving a signal on a first channel associated with the first base station with the first transceiver;

measuring the signal strength of the signal received on the first channel by the first transceiver;

determining whether the first transceiver is functional by comparing the signal strength measurements of the signal received by the first transceiver to signal strength measurements of corresponding signal received by a second transceiver at the first base station;

after verifying that the first transceiver is operational, receiving signals on a second channel associated with a second base station in the remote cell with the first transceiver;

measuring the signal strength of the signals received by the first transceiver on the second channel; and determining the interference based on the signal strength of the signals received on the second channel.

2. The method of claim 1 wherein the first channel is a control channel associated with the first base station.

3. The method of claim 2 wherein receiving a signal on a channel associated with the first base station comprises receiving an access request on an access channel.

4. The method of claim 1 wherein receiving signals on second channel associated with a second base station comprises receiving access requests on an access channel associated with the second base station.

5. The method of claim 1 further comprising taking a predetermined action if the signal strength measurement of the signal received by the first transceiver does not match the signal strength measurement of the corresponding signal received by a second transceiver within predetermined limits.

6. A method of determining interference at a first base station located in a first cell from transceivers operating in a remote cell, said method comprising:

verifying the operation of a first transceiver used to perform signal strength measurements of signals transmitted by transceivers in the remote cell, wherein said verifying comprises:

listening for an access request on an access channel associated with the first base station with first and second transceivers located at the first base station;

generating an alarm if the second transceiver receives an access request that was not received by first transceiver;

after verifying that the first transceiver is operational, receiving signals on a second channel associated with a remote base station in a remote cell with the first transceiver;

measuring the signal strength of the signals received by the first transceiver on the second channel; and determining the interference based on the signal strength of the signals received on the second channel.

7. The method of claim 6 wherein listening for an access request on an access channel associated with the first base station with first and second transceivers located at the first base station comprises listening for a predetermined period of time.

8. The method of claim 7 further comprising sending a notification if no access request is received during the predetermined time period by either the first or second transceivers.

9. The method of claim 6 wherein receiving signals on second channel associated with a second base station comprises receiving access requests on an access channel associated with the second base station.

10. A method of determining interference at a first base station located in a first cell from transceivers operating in a remote cell, said method comprising:

verifying the operation of a first transceiver used to perform signal strength measurements of signals transmitted by transceivers in the remote cell, wherein said verifying comprises:

listening for an access request on a first access channel associated with the first base station with first and second transceivers located at the first base station;

if an access request is received by said first transceiver, measuring the signal strength of the access request received on the first access channel by the first and second transceivers, and comparing the signal strength measurement of the access request received by the first transceiver to the signal strength measurement of the access request received by the second transceiver;

generating an alarm if the signal strength measurement of the access request received by the first transceiver does not match the signal strength measurement of the access request received by the second transceiver, or the second transceiver receives an access request that was not received by first transceiver;

after verifying that the first transceiver is operational, receiving access requests on a second access channel associated with a second base station in the remote cell with the first transceiver;

measuring the signal strength of the access requests received by the first transceiver on the second access channel; and determining the interference based on the signal strength of the access received on the second channel by the first transceiver.

11. The method of claim 10 wherein listening for an access request on an access channel associated with the first base station with first and second transceivers located at the first base station comprises listening for a predetermined period of time.

12. The method of claim 11 further comprising sending a notification if no access request is received during the predetermined time period by either the first or second transceivers.

* * * * *